US008577675B2

(12) United States Patent
Jelinek

(10) Patent No.: US 8,577,675 B2
(45) Date of Patent: Nov. 5, 2013

(54) METHOD AND DEVICE FOR SPEECH ENHANCEMENT IN THE PRESENCE OF BACKGROUND NOISE

(75) Inventor: Milan Jelinek, Sherbrooke (CA)

(73) Assignee: Nokia Corporation, Espoo (FI)

( * ) Notice: Subject to any disclaimer, the term of this patent is extended or adjusted under 35 U.S.C. 154(b) by 1708 days.

(21) Appl. No.: 11/021,938

(22) Filed: Dec. 22, 2004

(65) Prior Publication Data

US 2005/0143989 A1 Jun. 30, 2005

(51) Int. Cl.

| | |
|---|---|
| ***G01L 21/00*** | (2006.01) |
| ***G10L 15/00*** | (2013.01) |
| ***H04M 1/00*** | (2006.01) |
| ***H04B 15/00*** | (2006.01) |

(52) U.S. Cl.

USPC ........... 704/225; 704/207; 704/210; 704/214; 704/215; 704/226; 704/227; 704/228; 704/231; 704/246; 379/392.01; 381/94.1; 381/94.2; 381/94.3

(58) Field of Classification Search

USPC .......... 704/225, 226, 227, 228, 228.231, 246, 704/233, 207, 210, 214, 215; 379/392.1; 381/94.1–94.3

See application file for complete search history.

(56) References Cited

U.S. PATENT DOCUMENTS 5,432,859 A * 7/1995 Yang et al. .................... 381/94.3
5,907,624 A * 5/1999 Takada .......................... 381/94.2
6,038,532 A * 3/2000 Kane et al. ..................... 704/233
6,044,341 A * 3/2000 Takahashi ...................... 704/226
6,097,820 A * 8/2000 Turner .......................... 381/94.3
6,098,038 A * 8/2000 Hermansky et al. .......... 704/226
6,317,709 B1 11/2001 Zack ............................. 704/225
6,351,731 B1 * 2/2002 Anderson et al. ............. 704/233
6,363,345 B1 * 3/2002 Marash et al. ................ 704/233
6,366,880 B1 * 4/2002 Ashley .......................... 704/226

(Continued)

FOREIGN PATENT DOCUMENTS

| | | |
|---|---|---|
| EP | 1 073 038 A2 | 1/2001 |
| EP | 1 073 038 A3 | 2/2003 |
| EP | 1 073 038 | 11/2004 |
| WO | WO 02/45075 A2 | 6/2002 |

OTHER PUBLICATIONS

Thiemann, J. 2001. Acoustic noise suppression for speech signals using auditorymasking effects. Master of Engineering thesis. Montreal, McGill University,Department of Electrical & Computer Engineering. 74 p.*

(Continued)

*Primary Examiner* — Paras D Shah
(74) *Attorney, Agent, or Firm* — Harrington & Smith

(57) ABSTRACT

In one aspect thereof the invention provides a method for noise suppression of a speech signal that includes, for a speech signal having a frequency domain representation dividable into a plurality of frequency bins, determining a value of a scaling gain for at least some of said frequency bins and calculating smoothed scaling gain values. Calculating smoothed scaling gain values includes, for the at least some of the frequency bins, combining a currently determined value of the scaling gain and a previously determined value of the smoothed scaling gain. In another aspect a method partitions the plurality of frequency bins into a first set of contiguous frequency bins and a second set of contiguous frequency bins having a boundary frequency there between, where the boundary frequency differentiates between noise suppression techniques, and changes a value of the boundary frequency as a function of the spectral content of the speech signal.

75 Claims, 4 Drawing Sheets

(56) References Cited

U.S. PATENT DOCUMENTS

| | | | | |
|---|---|---|---|---|
| 6,456,965 | B1 * | 9/2002 | Yeldener | 704/207 |
| 6,862,567 | B1 * | 3/2005 | Gao | 704/228 |
| 6,898,566 | B1 * | 5/2005 | Benyassine et al. | 704/226 |
| 6,947,888 | B1 * | 9/2005 | Huang | 704/214 |
| 7,058,572 | B1 * | 6/2006 | Nemer | 704/226 |
| 7,072,832 | B1 * | 7/2006 | Su et al. | 704/230 |
| 7,155,385 | B2 * | 12/2006 | Berestesky et al. | 704/215 |
| 7,191,123 | B1 * | 3/2007 | Bessette et al. | 704/225 |
| 7,209,567 | B1 * | 4/2007 | Kozel et al. | 381/94.3 |
| 2001/0001853 | A1 * | 5/2001 | Mauro et al. | 704/233 |
| 2001/0044722 | A1 * | 11/2001 | Gustafsson et al. | 704/258 |
| 2002/0002455 | A1 | 1/2002 | Accardi et al. | 704/226 |
| 2002/0152066 | A1 * | 10/2002 | Piket | 704/226 |
| 2003/0023430 | A1 | 1/2003 | Wang et al. | 704/226 |
| 2004/0049383 | A1 * | 3/2004 | Kato et al. | 704/226 |
| 2005/0027520 | A1 * | 2/2005 | Mattila et al. | 704/228 |
| 2005/0240401 | A1 * | 10/2005 | Ebenezer | 704/226 |
| 2006/0229869 | A1 * | 10/2006 | Nemer | 704/226 |

OTHER PUBLICATIONS

Berouti, M. et al., "Enhancement of Speech Corrupted by Acoustic Noise", Apr. 1979, Proc. IEEE ICASSP, Washington, D.C., pp. 208-211.

Maculay, R. J. et al., "Speech Enhancement Using a Soft-Decision Noise Suppression Filter", Apr. 1980, IEEE Transactions on Acoustics, Speech, and Signal Processing, vol. ASSP-28, No. 2., pp. 137-145.

Lockwood, P. et al., "Experiments With a Nonlinear Spectral Subtractor (NSS), Hidden Markov Models and the Projection, for Robust Speech Recognition in Cars", Jun. 1992, Speech Communication, vol. 11, pp. 215-228.

Boll, S. F., "Suppression of Acoustic Noise in Speech Using Spectral Subtraction", Apr. 1979, IEEE Transactions on Acoustics, Speech, and Signal Processing, vol. ASSP-27, No. 2., pp. 113-120.

* cited by examiner

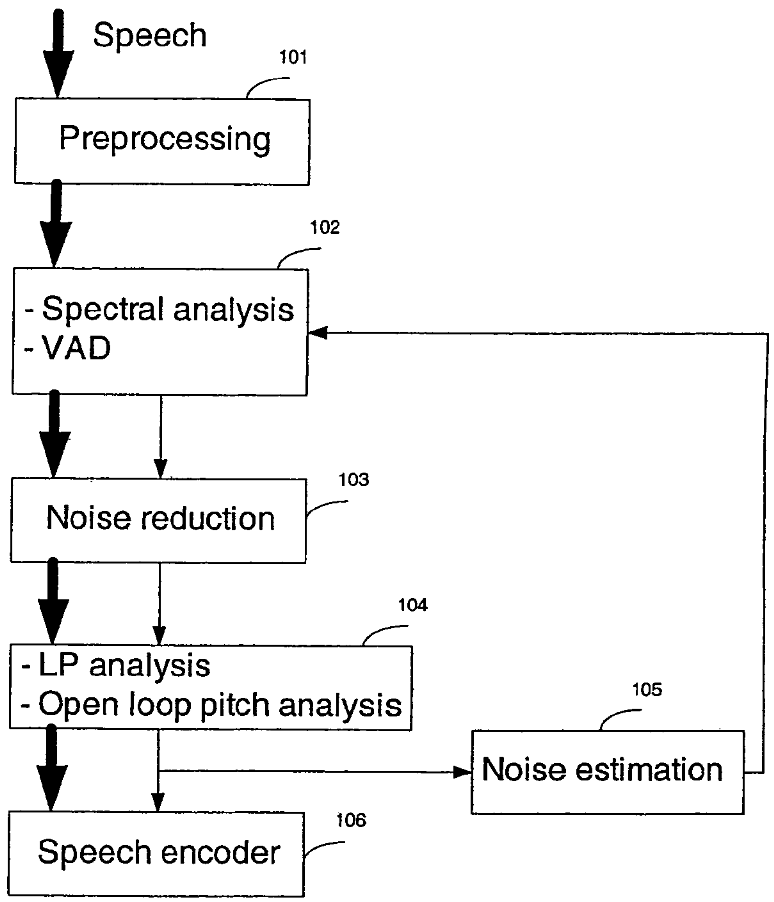
Figure 1: Schematic block diagram of speech communication system including noise reduction.

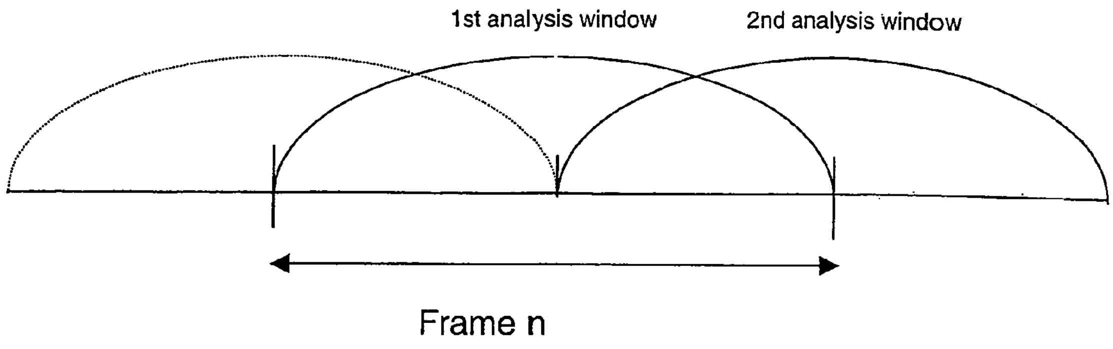
Figure 2: Illustration of windowing in spectral analysis.

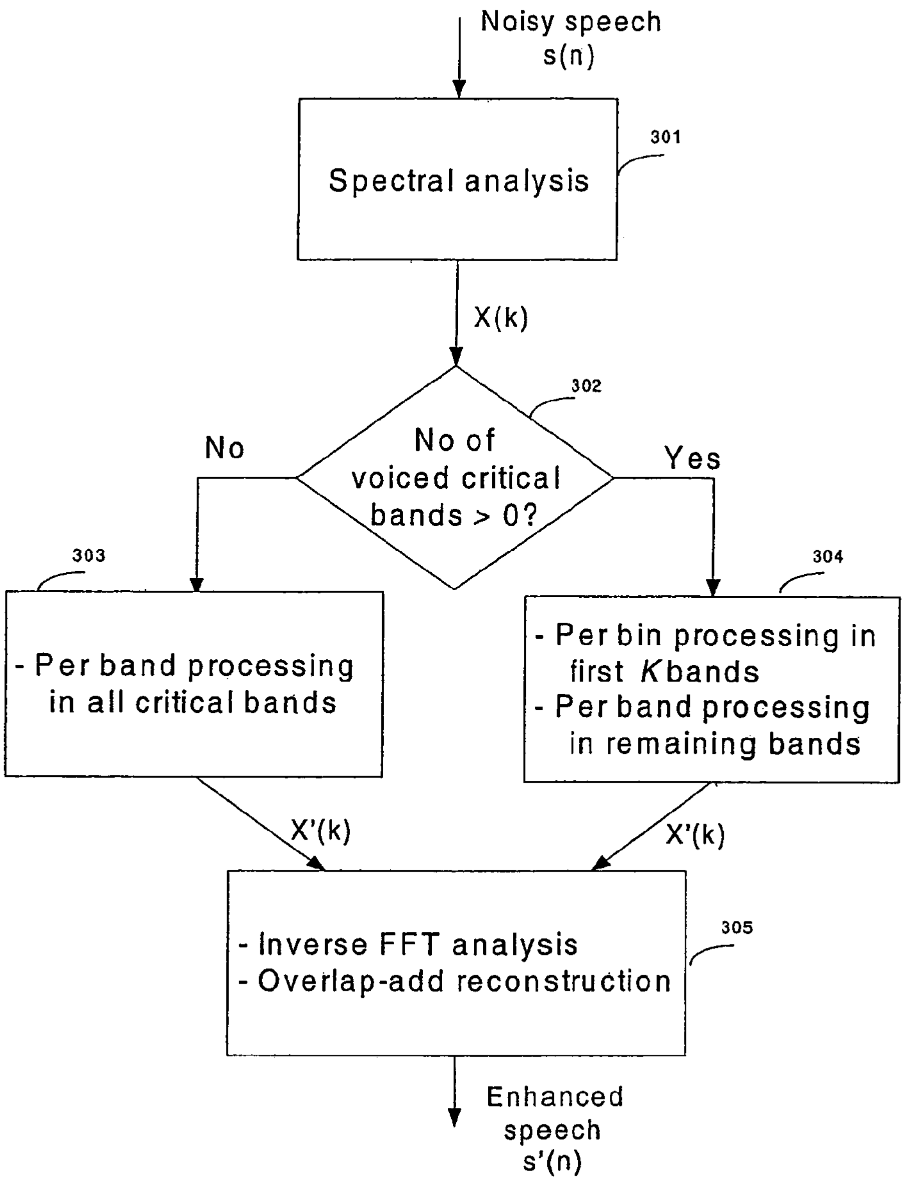
Figure 3: Overview of the disclosed noise reduction algorithm.

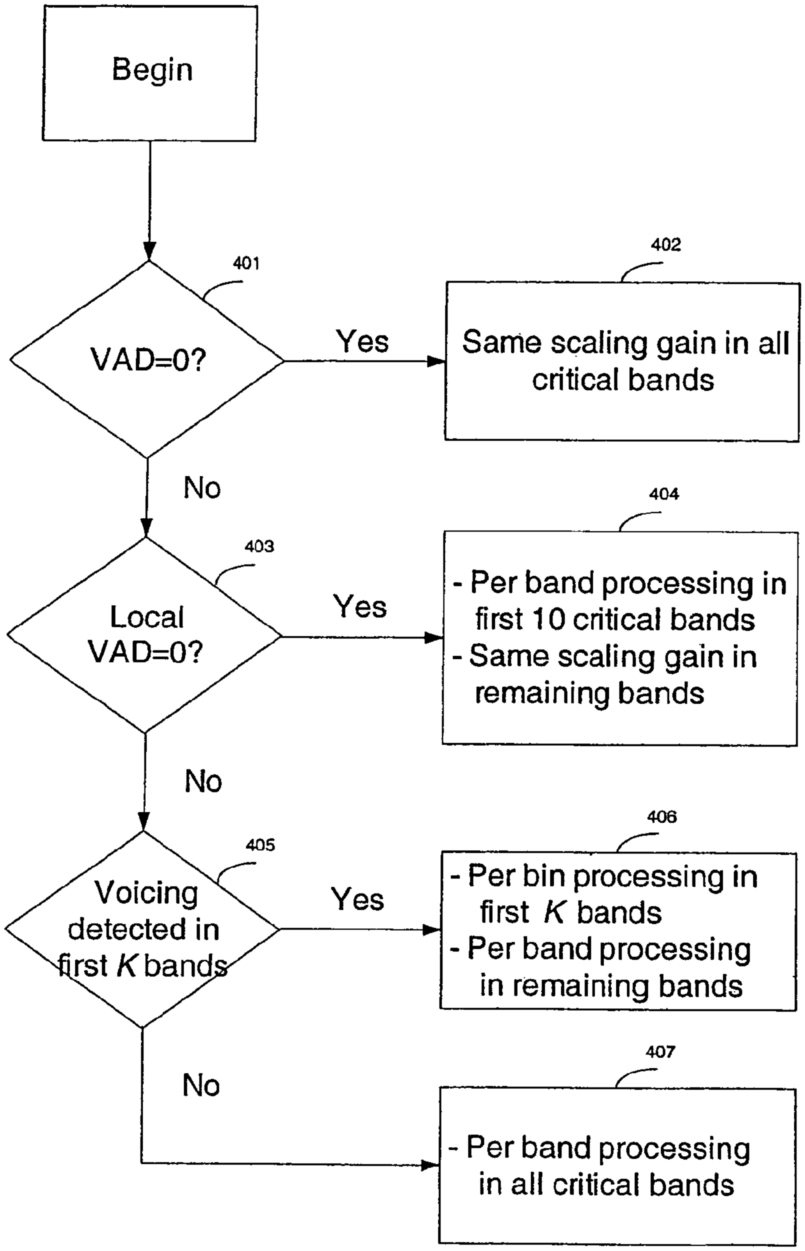
Figure 4: Schematic block diagram of class-specific noise reduction where the reduction algorithm depends on the nature of speech frame being processed.

METHOD AND DEVICE FOR SPEECH ENHANCEMENT IN THE PRESENCE OF BACKGROUND NOISE

FIELD OF THE INVENTION

The present invention relates to a technique for enhancing speech signals to improve communication in the presence of background noise. In particular but not exclusively, the present invention relates to the design of a noise reduction system that reduces the level of background noise in the speech signal.

BACKGROUND OF THE INVENTION

Reducing the level of background noise is very important in many communication systems. For example, mobile phones are used in many environments where high level of background noise is present. Such environments are usage in cars (which is increasingly becoming hands-free), or in the street, whereby the communication system needs to operate in the presence of high levels of car noise or street noise. In office applications, such as video-conferencing and hands-free internet applications, the system needs to efficiently cope with office noise. Other types of ambient noises can be also experienced in practice. Noise reduction, also known as noise suppression, or speech enhancement, becomes important for these applications, often needed to operate at low signal-to-noise ratios (SNR). Noise reduction is also important in automatic speech recognition systems which are increasingly employed in a variety of real environments. Noise reduction improves the performance of the speech coding algorithms or the speech recognition algorithms usually used in above-mentioned applications.

Spectral subtraction is one the mostly used techniques for noise reduction (see S. F. Boll, "Suppression of acoustic noise in speech using spectral subtraction," *IEEE Trans. Acoust., Speech, Signal Processing*, vol. ASSP-27, pp. 113-120, April 1979). Spectral subtraction attempts to estimate the short-time spectral magnitude of speech by subtracting a noise estimation from the noisy speech. The phase of the noisy speech is not processed, based on the assumption that phase distortion is not perceived by the human ear. In practice, spectral subtraction is implemented by forming an SNR-based gain function from the estimates of the noise spectrum and the noisy speech spectrum. This gain function is multiplied by the input spectrum to suppress frequency components with low SNR. The main disadvantage using conventional spectral subtraction algorithms is the resulting musical residual noise consisting of "musical tones" disturbing to the listener as well as the subsequent signal processing algorithms (such as speech coding). The musical tones are mainly due to variance in the spectrum estimates. To solve this problem, spectral smoothing has been suggested, resulting in reduced variance and resolution. Another known method to reduce the musical tones is to use an over-subtraction factor in combination with a spectral floor (see M. Berouti, R. Schwartz, and J. Makhoul, "Enhancement of speech corrupted by acoustic noise," in *Proc. IEEE ICASSP*, Washington, D.C., April 1979, pp. 208-211). This method has the disadvantage of degrading the speech when musical tones are sufficiently reduced. Other approaches are soft-decision noise suppression filtering (see R. J. McAulay and M. L. Malpass, "Speech enhancement using a soft decision noise suppression filter," *IEEE Trans. Acoust., Speech, Signal Processing*, vol. ASSP-28, pp. 137-145, April 1980) and nonlinear spectral subtraction (see P. Lockwood and J. Boudy, "Experiments with a nonlinear spectral subtractor (NSS), hidden Markov models and projection, for robust recognition in cars," *Speech Commun.*, vol. 11, pp. 215-228, June 1992).

SUMMARY OF THE INVENTION

In one aspect thereof this invention provides a method for noise suppression of a speech signal that includes, for a speech signal having a frequency domain representation dividable into a plurality of frequency bins, determining a value of a scaling gain for at least some of said frequency bins and calculating smoothed scaling gain values. Calculating smoothed scaling gain values comprises, for the at least some of the frequency bins, combining a currently determined value of the scaling gain and a previously determined value of the smoothed scaling gain.

In another aspect thereof this invention provides a method for noise suppression of a speech signal that includes, for a speech signal having a frequency domain representation dividable into a plurality of frequency bins, partitioning the plurality of frequency bins into a first set of contiguous frequency bins and a second set of contiguous frequency bins having a boundary frequency there between, where the boundary frequency differentiates between noise suppression techniques, and changing a value of the boundary frequency as a function of the spectral content of the speech signal.

In a further aspect thereof this invention provides a speech encoder that comprises a noise suppressor for a speech signal having a frequency domain representation dividable into a plurality of frequency bins. The noise suppressor is operable to determine a value of a scaling gain for at least some of the frequency bins and to calculate smoothed scaling gain values for the at least some of the frequency bins by combining a currently determined value of the scaling gain and a previously determined value of the smoothed scaling gain.

In a still further aspect thereof this invention provides a speech encoder that comprises a noise suppressor for a speech signal having a frequency domain representation dividable into a plurality of frequency bins. The noise suppressor is operable to partition the plurality of frequency bins into a first set of contiguous frequency bins and a second set of contiguous frequency bins having a boundary frequency there between. The boundary frequency differentiates between noise suppression techniques. The noise suppressor is further operable to change a value of the boundary frequency as a function of the spectral content of the speech signal.

In another aspect thereof this invention provides a computer program embodied on a computer readable medium that comprises program instructions for performing noise suppression of a speech signal comprising operations of, for a speech signal for a speech signal having a frequency domain representation dividable into a plurality of frequency bins, determining a value of a scaling gain for at least some of said frequency bins and calculating smoothed scaling gain values, comprising for said at least some of said frequency bins combining a currently determined value of the scaling gain and a previously determined value of the smoothed scaling gain.

In another aspect thereof this invention provides a computer program embodied on a computer readable medium that comprises program instructions for performing noise suppression of a speech signal comprising operations of, for a speech signal for a speech signal having a frequency domain representation dividable into a plurality of frequency bins, partitioning the plurality of frequency bins into a first set of contiguous frequency bins and a second set of contiguous frequency bins having a boundary frequency there between and changing a value of the boundary frequency as a function of the spectral content of the speech signal.

In a still further and certainly non-limiting aspect thereof this invention provides a speech encoder that includes means for suppressing noise in a speech signal having a frequency domain representation dividable into a plurality of frequency bins. The noise suppressing means comprises means for partitioning the plurality of frequency bins into a first set of contiguous frequency bins and a second set of contiguous frequency bins having a boundary there between, and for changing the boundary as a function of the spectral content of the speech signal. The noise suppressing means further comprises means for determining a value of a scaling gain for at least some of the frequency bins and for calculating smoothed scaling gain values for the at least some of the frequency bins by combining a currently determined value of the scaling gain and a previously determined value of the smoothed scaling gain. Calculating a smoothed scaling gain value preferably uses a smoothing factor having a value determined so that smoothing is stronger for smaller values of scaling gain. The noise suppressing means further comprises means for determining a value of a scaling gain for at least some frequency bands, where a frequency band comprises at least two frequency bins, and for calculating smoothed frequency band scaling gain values. The noise suppressing means further comprises means for scaling a frequency spectrum of the speech signal using the smoothed scaling gains, where for frequencies less than the boundary the scaling is performed on a per frequency bin basis, and for frequencies above the boundary the scaling is performed on a per frequency band basis.

BRIEF DESCRIPTION OF THE DRAWINGS

The foregoing and other objects, advantages and features of the present invention will become more apparent upon reading of the following non-restrictive description of an illustrative embodiment thereof, given by way of example only with reference to the accompanying drawings. In the appended drawings:

FIG. 1 is a schematic block diagram of speech communication system including noise reduction;

FIG. 2 shown an illustration of windowing in spectral analysis;

FIG. 3 gives an overview of an illustrative embodiment of noise reduction algorithm; and FIG. 4 is a schematic block diagram of an illustrative embodiment of class-specific noise reduction where the reduction algorithm depends on the nature of speech frame being processed.

DETAILED DESCRIPTION OF THE ILLUSTRATIVE EMBODIMENTS

In the present specification, efficient techniques for noise reduction are disclosed. The techniques are based at least in part on dividing the amplitude spectrum in critical bands and computing a gain function based on SNR per critical band similar to the approach used in the EVRC speech codec (see 3GPP2 C.S0014-0 "Enhanced Variable Rate Codec (EVRC) Service Option for Wideband Spread Spectrum Communication Systems", 3GPP2 Technical Specification, December 1999). For example, features are disclosed which use different processing techniques based on the nature of the speech frame being processed. In unvoiced frames, per band processing is used in the whole spectrum. In frames where voicing is detected up to a certain frequency, per bin processing is used in the lower portion of the spectrum where voicing is detected and per band processing is used in the remaining bands. In case of background noise frames, a constant noise floor is removed by using the same scaling gain in the whole spectrum. Further, a technique is disclosed in which the smoothing of the scaling gain in each band or frequency bin is performed using a smoothing factor which is inversely related to the actual scaling gain (smoothing is stronger for smaller gains). This approach prevents distortion in high SNR speech segments preceded by low SNR frames, as it is the case for voiced onsets for example.

One non-limiting aspect of this invention is to provide novel methods for noise reduction based on spectral subtraction techniques, whereby the noise reduction method depends on the nature of the speech frame being processed. For example, in voiced frames, the processing may be performed on per bin basis below a certain frequency.

In an illustrative embodiment, noise reduction is performed within a speech encoding system to reduce the level of background noise in the speech signal before encoding. The disclosed techniques can be deployed with either narrowband speech signals sampled at 8000 sample/s or wideband speech signals sampled at 16000 sample/s, or at any other sampling frequency. The encoder used in this illustrative embodiment is based on AMR-WB codec (see S. F. Boll, "Suppression of acoustic noise in speech using spectral subtraction," *IEEE Trans. Acoust., Speech, Signal Processing*, vol. ASSP-27, pp. 113-120, April 1979), which uses an internal sampling conversion to convert the signal sampling frequency to 12800 sample/s (operating on a 6.4 kHz bandwidth).

Thus the disclose noise reduction technique in this illustrative embodiment operates on either narrowband or wideband signals after sampling conversion to 12.8 kHz.

In case of wideband inputs, the input signal has to be decimated from 16 kHz to 12.8 kHz. The decimation is performed by first upsampling by 4, then filtering the output through lowpass FIR filter that has the cut off frequency at 6.4 kHz. Then, the signal is downsampled by 5. The filtering delay is 15 samples at 16 kHz sampling frequency.

In case of narrow-band inputs, the signal has to be upsampled from 8 kHz to 12.8 kHz. This is performed by first upsampling by 8, then filtering the output through lowpass FIR filter that has the cut off frequency at 6.4 kHz. Then, the signal is downsampled by 5. The filtering delay is 8 samples at 8 kHz sampling frequency.

After the sampling conversion, two preprocessing functions are applied to the signal prior to the encoding process: high-pass filtering and pre-emphasizing.

The high-pass filter serves as a precaution against undesired low frequency components. In this illustrative embodiment, a filter at a cut off frequency of 50 Hz is used, and it is given by $$H_{h1}(z) = \frac{0.982910156 - 1.965820313z^{-1} + 0.982910156z^{-2}}{1 - 1.965820313z^{-1} + 0.966308593z^{-2}}$$

In the pre-emphasis, a first order high-pass filter is used to emphasize higher frequencies, and it is given by $$H_{pre\text{-}emph}(z)=1-0.68z^{-1}$$

Preemphasis is used in AMR-WB codec to improve the codec performance at high frequencies and improve perceptual weighting in the error minimization process used in the encoder.

In the rest of this illustrative embodiment the signal at the input of the noise reduction algorithm is converted to 12.8 kHz sampling frequency and preprocessed as described above. However, the disclosed techniques can be equally applied to signals at other sampling frequencies such as 8 kHz or 16 kHz with and without preprocessing.

In the following, the noise reduction algorithm will be described in details. The speech encoder in which the noise reduction algorithm is used operates on 20 ms frames containing 256 samples at 12.8 kHz sampling frequency. Further, the coder uses 13 ms lookahead from the future frame in its analysis. The noise reduction follows the same framing structure. However, some shift can be introduced between the encoder framing and the noise reduction framing to maximize the use of the lookahead. In this description, the indices of samples will reflect the noise reduction framing.

FIG. 1 shows an overview of a speech communication system including noise reduction. In block 101, preprocessing is performed as the illustrative example described above.

In block 102, spectral analysis and voice activity detection (VAD) are performed. Two spectral analysis are performed in each frame using 20 ms windows with 50% overlap. In block 103, noise reduction is applied to the spectral parameters and then inverse DFT is used to convert the enhanced signal back to the time domain. Overlap-add operation is then used to reconstruct the signal.

In block 104, linear prediction (LP) analysis and open-loop pitch analysis are performed (usually as a part of the speech coding algorithm). In this illustrative embodiment, the parameters resulting from block 104 are used in the decision to update the noise estimates in the critical bands (block 105). The VAD decision can be also used as the noise update decision. The noise energy estimates updated in block 105 are used in the next frame in the noise reduction block 103 to computes the scaling gains. Block 106 performs speech encoding on the enhanced speech signal. In other applications, block 106 can be an automatic speech recognition system. Note that the functions in block 104 can be an integral part of the speech encoding algorithm.

Spectral Analysis

The discrete Fourier Transform is used to perform the spectral analysis and spectrum energy estimation. The frequency analysis is done twice per frame using 256-points Fast Fourier Transform (FFT) with a 50 percent overlap (as illustrated in FIG. 2). The analysis windows are placed so that all look ahead is exploited. The beginning of the first window is placed 24 samples after the beginning of the speech encoder current frame. The second window is placed 128 samples further. A square root of a Hanning window (which is equivalent to a sine window) has been used to weight the input signal for the frequency analysis. This window is particularly well suited for overlap-add methods (thus this particular spectral analysis is used in the noise suppression algorithm based on spectral subtraction and overlap-add analysis/synthesis). The square root Hanning window is given by $$w_{FFT}(n) = \sqrt{0.5 - 0.5\cos\left(\frac{2\pi n}{L_{FFT}}\right)} = \sin\left(\frac{\pi n}{L_{FFT}}\right), \quad n = 0, \ldots, L_{FFT}-1 \tag{1}$$

where $L_{FFT}$=256 is the size of FTT analysis. Note that only half the window is computed and stored since it is symmetric (from 0 to $L_{FFT}/2$).

Let s'(n) denote the signal with index 0 corresponding to the first sample in the noise reduction frame (in this illustrative embodiment, it is 24 samples more than the beginning of the speech encoder frame). The windowed signal for both spectral analysis are obtained as $$x_w^{(1)}(n)=w_{FFT}(n)s'(n),\ n=0, \ldots, L_{FFT}-1$$

$$x_w^{(2)}(n)=w_{FFT}(n)s'(n+L_{FFT}/2),\ n=0, \ldots, L_{FFT}-1$$

where s'(0) is the first sample in the present noise reduction frame.

FFT is performed on both windowed signals to obtain two sets of spectral parameters per frame:

$$X^{(1)}(k) = \sum_{n=0}^{N-1} x_w^{(1)}(n)e^{-j2\pi\frac{kn}{N}},\ k = 0, \ldots, L_{FFT}-1$$

$$X^{(2)}(k) = \sum_{n=0}^{N-1} x_w^{(2)}(n)e^{-j2\pi\frac{kn}{N}},\ k = 0, \ldots, L_{FFT}-1$$

The output of the FFT gives the real and imaginary parts of the spectrum denoted by $X_R(k)$, k=0 to 128, and $X_I(k)$, k=1 to 127. Note that $X_R(0)$ corresponds to the spectrum at 0 Hz (DC) and $X_R(128)$ corresponds to the spectrum at 6400 Hz. The spectrum at these points is only real valued and usually ignored in the subsequent analysis.

After FFT analysis, the resulting spectrum is divided into critical bands using the intervals having the following upper limits (20 bands in the frequency range 0-6400 Hz):

Critical bands={100.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 4400.0, 5300.0, 6350.0} Hz.

See D. Johnston, "Transform coding of audio signal using perceptual noise criteria," *IEEE J. Select. Areas Commun.*, vol. 6, pp. 314-323, February 1988.

The 256-point FFT results in a frequency resolution of 50 Hz (6400/128). Thus after ignoring the DC component of the spectrum, the number of frequency bins per critical band is $M_{CB}$={2, 2, 2, 2, 2, 2, 3, 3, 3, 4, 4, 5, 6, 6, 8, 9, 11, 14, 18, 21}, respectively.

The average energy in a critical band is computed as $$E_{CB}(i) = \frac{1}{(L_{FFT}/2)^2 M_{CB}(i)} \sum_{k=0}^{M_{CB}(i)-1} (X_R^2(k+j_i) + X_I^2(k+j_i)), \quad i = 0, \ldots, 19, \tag{2}$$

where $X_R(k)$ and $X_I(k)$ are, respectively, the real and imaginary parts of the kth frequency bin and $j_i$ is the index of the first bin in the ith critical band given by $j_i$={1, 3, 5, 7, 9, 11, 13, 16, 19, 22, 26, 30, 35, 41, 47, 55, 64, 75, 89, 107}.

The spectral analysis module also computes the energy per frequency bin, $E_{BIN}(k)$, for the first 17 critical bands (74 bins excluding the DC component)

$$E_{BIN}(k)=X_R^2(k)+X_I^2(k),\ k=0, \ldots, 73 \tag{3}$$

Finally, the spectral analysis module computes the average total energy for both FTT analyses in a 20 ms frame by adding the average critical band energies $E_{CB}$. That is, the spectrum energy for a certain spectral analysis is computed as $$E_{frame}=\sum_{i=0}^{19}E_{CB}(i) \quad (4)$$

and the total frame energy is computed as the average of spectrum energies of both spectral analysis in a frame. That is $$E_t=10\log(0.5(E_{frame}(0)+E_{frame}(1)),dB \quad (5)$$

The output parameters of the spectral analysis module, that is average energy per critical band, the energy per frequency bin, and the total energy, are used in VAD, noise reduction, and rate selection modules.

Note that for narrow-band inputs sampled at 8000 sample/s, after sampling conversion to 12800 sample/s, there is no content at both ends of the spectrum, thus the first lower frequency critical band as well as the last three high frequency bands are not considered in the computation of output parameters (only bands from i=1 to 16 are considered).

Voice Activity Detection

The spectral analysis described above is performed twice per frame. Let $E_{CB}^{(1)}(i)$ and $E_{CB}^{(2)}(i)$ denote the energy per critical band information for the first and second spectral analysis, respectively (as computed in Equation (2)). The average energy per critical band for the whole frame and part of the previous frame is computed as $$E_{av}(i)=0.2E_{CB}^{(0)}(i)+0.4E_{CB}^{(1)}(i)+0.4E_{CB}^{(2)}(i) \quad (6)$$

where $E_{CB}^{(0)}(i)$ denote the energy per critical band information from the second analysis of the previous frame. The signal-to-noise ratio (SNR) per critical band is then computed as $$\mathrm{SNR}_{CB}(i)=E_{av}(i)/N_{CB}(i) \text{ bounded by } \mathrm{SNR}_{CB}\geq 1. \quad (7)$$

where $N_{CB}(i)$ is the estimated noise energy per critical band as will be explained in the next section. The average SNR per frame is then computed as $$SNR_{av}=10\log\left(\sum_{i=b_{min}}^{b_{max}}SNR_{CB}(i)\right), \quad (8)$$

where $b_{min}$=0 and $b_{max}$=19 in case of wideband signals, and $b_{min}$=1 and $b_{max}$=16 in case of narrowband signals.

The voice activity is detected by comparing the average SNR per frame to a certain threshold which is a function of the long-term SNR. The long-term SNR is given by $$\mathrm{SNR}_{LT}=\overline{E}_f-\overline{N}_f \quad (9)$$

where $\overline{E}_f$ and $\overline{N}_f$ are computed using equations (12) and (13), respectively, which will be described later. The initial value of $\overline{E}_f$ is 45 dB.

The threshold is a piece-wise linear function of the long-term SNR. Two functions are used, one for clean speech and one for noisy speech.

For wideband signals, If $\mathrm{SNR}_{LT}$<35 (noisy speech) then $$th_{VAD}=0.4346\,\mathrm{SNR}_{LT}+13.9575$$

else (clean speech)

$$th_{VAD}=1.0333\,\mathrm{SNR}_{LT}-7$$

For narrowband signals, If $\mathrm{SNR}_{LT}$<29.6 (noisy speech) then $$th_{VAD}=0.313\,\mathrm{SNR}_{LT}+14.6$$

else (clean speech)

$$th_{VAD}=1.0333\,\mathrm{SNR}_{LT}-7$$

Further, a hysteresis in the VAD decision is added to prevent frequent switching at the end of an active speech period. It is applied in case the frame is in a soft hangover period or if the last frame is an active speech frame. The soft hangover period consists of the first 10 frames after each active speech burst longer than 2 consecutive frames. In case of noisy speech ($\mathrm{SNR}_{LT}$<35) the hysteresis decreases the VAD decision threshold by $$th_{VAD}=0.95\,th_{VAD}$$

In case of clean speech the hysteresis decreases the VAD decision threshold by $$th_{VAD}=th_{VAD}-11$$

If the average SNR per frame is larger than the VAD decision threshold, that is, if $\mathrm{SNR}_{av}>\mathrm{th}_{VAD}$, then the frame is declared as an active speech frame and the VAD flag and a local VAD flag are set to 1. Otherwise the VAD flag and the local VAD flag are set to 0. However, in case of noisy speech, the VAD flag is forced to 1 in hard hangover frames, i.e. one or two inactive frames following a speech period longer than 2 consecutive frames (the local VAD flag is then equal to 0 but the VAD flag is forced to 1).

First Level of Noise Estimation and Update

In this section, the total noise energy, relative frame energy, update of long-term average noise energy and long-term average frame energy, average energy per critical band, and a noise correction factor are computed. Further, noise energy initialization and update downwards are given.

The total noise energy per frame is given by $$N_{tot}=10\log\left(\sum_{i=0}^{19}N_{CB}(i)\right) \quad (10)$$

where $N_{CB}(i)$ is the estimated noise energy per critical band.

The relative energy of the frame is given by the difference between the frame energy in dB and the long-term average energy. The relative frame energy is given by $$E_{rel}=E_t-\overline{E}_f \quad (11)$$

where $E_t$, is given in Equation (5).

The long-term average noise energy or the long-term average frame energy are updated in every frame. In case of active speech frames (VAD flag=1), the long-term average frame energy is updated using the relation $$\overline{E}_f=0.99\overline{E}_f+0.01E_t \quad (12)$$

with initial value $\overline{E}_f$=45 dB.

In case of inactive speech frames (VAD flag=0), the long-term average noise energy is updated by $$\overline{N}_f=0.99\overline{N}_f+0.01N_{tot} \quad (13)$$

The initial value of $\overline{N}_f$ is set equal to $N_{tot}$ for the first 4 frames. Further, in the first 4 frames, the value of $\overline{E}_f$ is bounded by $\overline{E}_f\geq N_{tot}+10$.

Frame Energy per Critical Band, Noise Initialization, and Noise Update Downward:

The frame energy per critical band for the whole frame is computed by averaging the energies from both spectral analyses in the frame. That is, $$\overline{E}_{CB}(i)=0.5E_{CB}^{(1)}(i)+0.5E_{CB}^{(2)}(i) \quad (14)$$

The noise energy per critical band $N_{CB}(i)$ is initially initialized to 0.03. However, in the first 5 subframes, if the signal energy is not too high or if the signal doesn't have strong high frequency components, then the noise energy is initialized using the energy per critical band so that the noise reduction algorithm can be efficient from the very beginning of the processing. Two high frequency ratios are computed: $r_{15,16}$ is the ratio between the average energy of critical bands 15 and 16 and the average energy in the first 10 bands (mean of both spectral analyses), and $r_{18,19}$ is the same but for bands 18 and 19.

In the first 5 frames, if $E_t<49$ and $r_{15,16}<2$ and $r_{18,19}<1.5$ then for the first 3 frames, $$N_{CB}(i)=\overline{E}_{CB}(i),\ i=0,\ldots,19 \tag{15}$$

and for the following two frames $N_{CB}(i)$ is updated by $$N_{CB}(i)=0.33N_{CB}(i)+0.66\overline{E}_{CB}(i),\ i=0,\ldots,19 \tag{16}$$

For the following frames, at this stage, only noise energy update downward is performed for the critical bands whereby the energy is less than the background noise energy. First, the temporary updated noise energy is computed as $$N_{tmp}(i)=0.9N_{CB}(i)+0.1(0.25E_{CB}^{(0)}(i)+0.75\overline{E}_{CB}(i)) \tag{17}$$

where $E_{CB}^{(0)}(i)$ correspond to the second spectral analysis from previous frame.

Then for i=0 to 19, if $N_{tmp}(i)<N_{CB}(i)$ then $N_{CB}(i)=N_{tmp}(i)$.

A second level of noise update is performed later by setting $N_{CB}(i)=N_{tmp}(i)$ if the frame is declared as inactive frame. The reason for fragmenting the noise energy update into two parts is that the noise update can be executed only during inactive speech frames and all the parameters necessary for the speech activity decision are hence needed. These parameters are however dependent on LP prediction analysis and open-loop pitch analysis, executed on denoised speech signal. For the noise reduction algorithm to have as accurate noise estimate as possible, the noise estimation update is thus updated downwards before the noise reduction execution and upwards later on if the frame is inactive. The noise update downwards is safe and can be done independently of the speech activity.

Noise Reduction:

Noise reduction is applied on the signal domain and denoised signal is then reconstructed using overlap and add. The reduction is performed by scaling the spectrum in each critical band with a scaling gain limited between $g_{min}$ and 1 and derived from the signal-to-noise ratio (SNR) in that critical band. A new feature in the noise suppression is that for frequencies lower than a certain frequency related to the signal voicing, the processing is performed on frequency bin basis and not on critical band basis. Thus, a scaling gain is applied on every frequency bin derived from the SNR in that bin (the SNR is computed using the bin energy divided by the noise energy of the critical band including that bin). This new feature allows for preserving the energy at frequencies near to harmonics preventing distortion while strongly reducing the noise between the harmonics. This feature can be exploited only for voiced signals and, given the frequency resolution of the frequency analysis used, for signals with relatively short pitch period. However, these are precisely the signals where the noise between harmonics is most perceptible.

FIG. 3 shows an overview of the disclosed procedure. In block 301, spectral analysis is performed. Block 302 verifies if the number of voiced critical bands is larger than 0. If this is the case then noise reduction is performed in block 304 where per bin processing is performed in the first voiced K bands and per band processing is performed in the remaining bands. If K=0 then per band processing is applied to all the critical bands. After noise reduction on the spectrum, block 305 performs inverse DFT analysis and overlap-add operation is used to reconstruct the enhanced speech signal as will be described later.

The minimum scaling gain $g_{min}$ is derived from the maximum allowed noise reduction in dB, $NR_{max}$. The maximum allowed reduction has a default value of 14 dB. Thus minimum scaling gain is given by $$g_{min}=10^{-NR_{max}/20} \tag{18}$$

and it is equal to 0.19953 for the default value of 14 dB.

In case of inactive frames with VAD=0, the same scaling is applied over the whole spectrum and is given by $g_s=0.9g_{min}$ if noise suppression is activated (if $g_{min}$ is lower than 1). That is, the scaled real and imaginary components of the spectrum are given by $$X'_R(k)=g_sX_R(k),\ k=1,\ldots,128,\ \text{and}\ X'_I(k)=g_sX_I(k),\ k=1,\ldots,127. \tag{19}$$

Note that for narrowband inputs, the upper limits in Equation (19) are set to 79 (up to 3950 Hz).

For active frames, the scaling gain is computed related to the SNR per critical band or per bin for the first voiced bands. If $K_{VOIC}>0$ then per bin noise suppression is performed on the first $K_{VOIC}$ bands. Per band noise suppression is used on the rest of the bands. In case $K_{VOIC}=0$ per band noise suppression is used on the whole spectrum. The value of $K_{VOIC}$ is updated as will be described later. The maximum value of $K_{VOIC}$ is 17, therefore per bin processing can be applied only on the first 17 critical bands corresponding to a maximum frequency of 3700 Hz. The maximum number of bins for which per bin processing can be used is 74 (the number of bins in the first 17 bands). An exception is made for hard hangover frames that will be described later in this section.

In an alternative implementation, the value of $K_{VOIC}$ may be fixed. In this case, in all types of speech frames, per bin processing is performed up to a certain band and the per band processing is applied to the other bands.

The scaling gain in a certain critical band, or for a certain frequency bin, is computed as a function of SNR and given by $$(g_s)^2=k_s\mathrm{SNR}+c_s,\ \text{bounded by}\ g_{min}\le g_s\le 1 \tag{20}$$

The values of $k_s$ and $c_s$ are determined such as $g_s=g_{min}$ for SNR=1, and $g_s=1$ for SNR=45. That is, for SNRs at 1 dB and lower, the scaling is limited to $g_s$ and for SNRs at 45 dB and higher, no noise suppression is performed in the given critical band ($g_s=1$). Thus, given these two end points, the values of $k_s$ and $c_s$ in Equation (20) are given by $$k_s=(1-g_{min}^2)/44\ \text{and}\ c_s=(45g_{min}^2-1)/44. \tag{21}$$

The variable SNR in Equation (20) is either the SNR per critical band, $SNR_{CB}(i)$, or the SNR per frequency bin, $SNR_{BIN}(k)$, depending on the type of processing.

The SNR per critical band is computed in case of the first spectral analysis in the frame as $$SNR_{CB}(i)=\frac{0.2E_{CB}^{(0)}(i)+0.6E_{CB}^{(1)}(i)+0.2E_{CB}^{(2)}(i)}{N_{CB}(i)}\quad i=0,\ldots,19 \tag{22}$$

and for the second spectral analysis, the SNR is computed as $$SNR_{CB}(i)=\frac{0.4E_{CB}^{(1)}(i)+0.6E_{CB}^{(2)}(i)}{N_{CB}(i)}\quad i=0,\ldots,19 \tag{23}$$

where $E_{CB}^{(1)}(i)$ and $E_{CB}^{(2)}(i)$ denote the energy per critical band information for the first and second spectral analysis, respectively (as computed in Equation (2)), $E_{CB}^{(0)}(i)$ denote the energy per critical band information from the second analysis of the previous frame, and $N_{CB}(i)$ denote the noise energy estimate per critical band.

The SNR per critical bin in a certain critical band i is computed in case of the first spectral analysis in the frame as $$SNR_{BIN}(k) = \frac{0.2E_{BIN}^{(0)}(k) + 0.6E_{BIN}^{(1)}(k) + 0.2E_{BIN}^{(2)}(k)}{N_{CB}(i)}, \quad k = j_i, \ldots, j_i + M_{CB}(i) - 1 \tag{24}$$

and for the second spectral analysis, the SNR is computed as $$SNR_{BIN}(k) = \frac{0.4E_{BIN}^{(1)}(k) + 0.6E_{BIN}^{(2)}(k)}{N_{CB}(i)}, \quad k = j_i, \ldots, j_i + M_{CB}(i) - 1 \tag{25}$$

where $E_{BIN}^{(1)}(k)$ and $E_{BIN}^{(2)}(k)$ denote the energy per frequency bin for the first and second spectral analysis, respectively (as computed in Equation (3)), $E_{BIN}^{(0)}(k)$ denote the energy per frequency bin from the second analysis of the previous frame, $N_{CB}(i)$ denote the noise energy estimate per critical band, $j_i$ is the index of the first bin in the ith critical band and $M_{CB}(i)$ is the number of bins in critical band i defined in above.

In case of per critical band processing for a band with index i, after determining the scaling gain as in Equation (20), and using SNR as defined in Equations (24) or (25), the actual scaling is performed using a smoothed scaling gain updated in every frequency analysis as $$g_{CB,LP}(i) = \alpha_{gs} g_{CB,LP}(i) + (1-\alpha_{gs}) g_s \tag{26}$$

In this invention, a novel feature is disclosed where the smoothing factor is adaptive and it is made inversely related to the gain itself In this illustrative embodiment the smoothing factor is given by $\alpha_{gs}=1-g_s$. That is, the smoothing is stronger for smaller gains $g_s$. This approach prevents distortion in high SNR speech segments preceded by low SNR frames, as it is the case for voiced onsets. For example in unvoiced speech frames the SNR is low thus a strong scaling gain is used to reduce the noise in the spectrum. If an voiced onset follows the unvoiced frame, the SNR becomes higher, and if the gain smoothing prevents a speedy update of the scaling gain, then it is likely that a strong scaling will be used on the voiced onset which will result in poor performance. In the proposed approach, the smoothing procedure is able to quickly adapt and use lower scaling gains on the onset.

The scaling in the critical band is performed as $$X'_R(k+j_i) = g_{CB,LP}(i) X_R(k+j_i), \text{ and}$$

$$X'_I(k+j_i) = g_{CB,LP}(i) X_I(k+j_i), \; k=0, \ldots, M_{CB}(i)-1' \tag{27}$$

where $j_i$ is the index of the first bin in the critical band i and $M_{CB}(i)$ is the number of bins in that critical band.

In case of per bin processing in a band with index i, after determining the scaling gain as in Equation (20), and using SNR as defined in Equations (24) or (25), the actual scaling is performed using a smoothed scaling gain updated in every frequency analysis as $$g_{BIN,LP}(k) = \alpha_{gs} g_{BIN,LP}(k) + (1-\alpha_{gs}) g_s \tag{28}$$

where $\alpha_{gs}=1-g_s$ similar to Equation (26).

Temporal smoothing of the gains prevents audible energy oscillations while controlling the smoothing using $\alpha_{gs}$ prevents distortion in high SNR speech segments preceded by low SNR frames, as it is the case for voiced onsets for example.

The scaling in the critical band i is performed as $$X'_R(k+j_i) = g_{BIN,LP}(k+j_i) X_R(k+j_i), \text{ and}$$

$$X'_I(k+j_i) = g_{BIN,LP}(k+j_i) X_I(k+j_i), \; k=0, \ldots, M_{CB}(i)-1' \tag{29}$$

where $j_i$ is the index of the first bin in the critical band i and $M_{CB}(i)$ is the number of bins in that critical band.

The smoothed scaling gains $g_{BIN,LP}(k)$ and $g_{CB,LP}(i)$ are initially set to 1. Each time an inactive frame is processed (VAD=0), the smoothed gains values are reset to $g_{min}$ defined in Equation (18).

As mentioned above, if $K_{VOIC}>0$ per bin noise suppression is performed on the first $K_{VOIC}$ bands, and per band noise suppression is performed on the remaining bands using the procedures described above. Note that in every spectral analysis, the smoothed scaling gains $g_{CB,LP}(i)$ are updated for all critical bands (even for voiced bands processed with per bin processing—in this case $g_{CB,LP}(i)$ is updated with an average of $g_{BIN,LP}(k)$ belonging to the band i). Similarly, scaling gains $g_{BIN,LP}(k)$ are updated for all frequency bins in the first 17 bands (up to bin 74). For bands processed with per band processing they are updated by setting them equal to $g_{CB,LP}(i)$ in these 17 specific bands.

Note that in case of clean speech, noise suppression is not performed in active speech frames (VAD=1). This is detected by finding the maximum noise energy in all critical bands, $\max(N_{CB}(i))$, $i=0, \ldots, 19$, and if this value is less or equal 15 then no noise suppression is performed.

As mentioned above, for inactive frames (VAD=0), a scaling of 0.9 $g_{min}$ is applied on the whole spectrum, which is equivalent to removing a constant noise floor. For VAD short-hangover frames (VAD=1 and local_VAD=0), per band processing is applied to the first 10 bands as described above (corresponding to 1700 Hz), and for the rest of the spectrum, a constant noise floor is subtracted by scaling the rest of the spectrum by a constant value $g_{min}$. This measure reduces significantly high frequency noise energy oscillations. For these bands above the $10^{th}$ band, the smoothed scaling gains $g_{CB,LP}(i)$ are not reset but updated using Equation (26) with $g_s=g_{min}$ and the per bin smoothed scaling gains $g_{BIN,LP}(k)$ are updated by setting them equal to $g_{CB,LP}(i)$ in the corresponding critical bands.

The procedure described above can be seen as a class-specific noise reduction where the reduction algorithm depends on the nature of speech frame being processed. This is illustrated in FIG. 4. Block 401 verifies if the VAD flag is 0 (inactive speech). If this is the case then a constant noise floor is removed from the spectrum by applying the same scaling gain on the whole spectrum (block 402). Otherwise, block 403 verifies if the frame is VAD hangover frame. If this is the case then per band processing is used in the first 10 bands and the same scaling gain is used in the remaining bands (block 406). Otherwise, block 405 verifies if voicing is detected in the first bands in the spectrum. If this is the case then per bin processing is performed in the first K voiced bands and per band processing is performed in the remaining bands (block 406). If no voiced bands are detected then per band processing is performed in all critical bands (block 407).

In case of processing of narrowband signals (upsampled to 12800 Hz), the noised suppression is performed on the first 17 bands (up to 3700 Hz). For the remaining 5 frequency bins between 3700 Hz and 4000 Hz, the spectrum is scaled using the last scaling gain $g_s$ at the bin at 3700 Hz. For the remaining of the spectrum (from 4000 Hz to 6400 Hz), the spectrum is zeroed.

Reconstruction of Denoised Signal:

After determining the scaled spectral components, $X'_R(k)$ and $X'_I(k)$, inverse FFT is applied on the scaled spectrum to obtain the windowed denoised signal in the time domain.

$$x_{w,d}(n) = \frac{1}{N}\sum_{k=0}^{N-1} X(k)e^{j2\pi\frac{kn}{N}},\ n = 0, \ldots, L_{FFT}-1$$

This is repeated for both spectral analysis in the frame to obtain the denoised windowed signals $$x_{w,d}^{(1)}(n) \text{ and } x_{w,d}^{(2)}(n).$$

For every half frame, the signal is reconstructed using an overlap-add operation for the overlapping portions of the analysis. Since a square root Hanning window is used on the original signal prior to spectral analysis, the same window is applied at the output of the inverse FFT prior to overlap-add operation. Thus, the doubled windowed denoised signal is given by $$x_{ww,d}^{(1)}(n) = w_{FFT}(n)x_{w,d}^{(1)}(n),\ n = 0, \ldots, L_{FFT}-1 \quad (30)$$
$$x_{ww,d}^{(2)}(n) = w_{FFT}(n)x_{w,d}^{(2)}(n),\ n = 0, \ldots, L_{FFT}-1$$

For the first half of the analysis window, the overlap-add operation for constructing the denoised signal is performed as $$s(n) = x_{ww,d}^{(0)}(n + L_{FFT}/2) + x_{ww,d}^{(1)}(n),\ n = 0, \ldots, L_{FFT}/2-1$$

and for the second half of the analysis window, the overlap-add operation for constructing the denoised signal is performed as $$s(n + L_{FFT}/2) = x_{ww,d}^{(1)}(n + L_{FFT}/2) + x_{ww,d}^{(2)}(n),$$
$$n = 0, \ldots, L_{FFT}/2-1$$

where $$x_{ww,d}^{(0)}(n)$$

is the double windowed denoised signal from the second analysis in the previous frame.

Note that with overlap-add operation, since there a 24 sample shift between the speech encoder frame and noise reduction frame, the denoised signal can be reconstructed up to 24 sampled from the lookahead in addition to the present frame. However, another 128 samples are still needed to complete the lookahead needed by the speech encoder for linear prediction (LP) analysis and open-loop pitch analysis. This part is temporary obtained by inverse windowing the second half of the denoised windowed signal $$x_{w,d}^{(2)}(n)$$

without performing overlap-add operation. That is $$s(n + L_{FFT}) = x_{ww,d}^{(2)}(n + L_{FFT}/2)w_{FFT}^2(n + L_{FFT}/2),$$
$$n = 0, \ldots, L_{FFT}/2-1$$

Note that this portion of the signal is properly recomputed in the next frame using overlap-add operation.

Noise Energy Estimates Update

This module updates the noise energy estimates per critical band for noise suppression. The update is performed during inactive speech periods. However, the VAD decision performed above, which is based on the SNR per critical band, is not used for determining whether the noise energy estimates are updated. Another decision is performed based on other parameters independent of the SNR per critical band. The parameters used for the noise update decision are: pitch stability, signal non-stationarity, voicing, and ratio between 2nd order and $16^{th}$ order LP residual error energies and have generally low sensitivity to the noise level variations.

The reason for not using the encoder VAD decision for noise update is to make the noise estimation robust to rapidly changing noise levels. If the encoder VAD decision were used for the noise update, a sudden increase in noise level would cause an increase of SNR even for inactive speech frames, preventing the noise estimator to update, which in turn would maintain the SNR high in following frames, and so on. Consequently, the noise update would be blocked and some other logic would be needed to resume the noise adaptation.

In this illustrative embodiment, open-loop pitch analysis is performed at the encoder to compute three open-loop pitch estimates per frame: $d_0$, $d_1$, and $d_2$, corresponding to the first half-frame, second half-frame, and the lookahead, respectively. The pitch stability counter is computed as $$pc=|d_0-d_{-1}|+|d_1-d_0|+|d_2-d_1| \quad (31)$$

where $d_{-1}$ is the lag of the second half-frame of the pervious frame. In this illustrative embodiment, for pitch lags larger than 122, the open-loop pitch search module sets $d_2=d_1$. Thus, for such lags the value of pc in equation (31) is multiplied by 3/2 to compensate for the missing third term in the equation. The pitch stability is true if the value of pc is less than 12. Further, for frames with low voicing, pc is set to 12 to indicate pitch instability. That is $$\text{If } (C_{norm}(d_0)+C_{norm}(d_1)+C_{norm}(d_2))/3+r_e<0.7 \text{ then } pc=12, \quad (32)$$

where $C_{norm}(d)$ is the normalized raw correlation and $r_e$ is an optional correction added to the normalized correlation in order to compensate for the decrease of normalized correlation in the presence of background noise. In this illustrative embodiment, the normalized correlation is computed based on the decimated weighted speech signal $s_{wd}(n)$ and given by $$C_{norm}(d) = \frac{\sum_{n=0}^{L_{sec}} s_{wd}(n)s_{wd}(n-d)}{\sqrt{\sum_{n=0}^{L_{sec}} s_{wd}^2(n)\sum_{n=0}^{L_{sec}} s_{wd}^2(n-d)}},$$

where the summation limit depends on the delay itself. In this illustrative embodiment, the weighted signal used in open-loop pitch analysis is decimated by 2 and the summation limits are given according to

| |
|---|
| $L_{sec}$ = 40 for d = 10, . . . , 16 |
| $L_{sec}$ = 40 for d = 17, . . . , 31 |
| $L_{sec}$ = 62 for d = 32, . . . , 61 |
| $L_{sec}$ = 115 for d = 62, . . . , 115 |

The signal non-stationarity estimation is performed based on the product of the ratios between the energy per critical band and the average long term energy per critical band.

The average long term energy per critical band is updated by $$E_{CB,LT}(i)=\alpha_e E_{CB,LT}(i)+(1-\alpha_e)\overline{E}_{CB}(i), \text{ for } i=b_{min} \text{ to } b_{max}, \quad (33)$$

where $b_{min}$=0 and $b_{max}$=19 in case of wideband signals, and $b_{min}$=1 and $b_{max}$=16 in case of narrowband signals, and $\overline{E}_{CB}(i)$ is the frame energy per critical band defined in Equation (14). The update factor $\alpha_e$ is a linear function of the total frame energy, defined in Equation (5), and it is given as follows:

For wideband signals: $\alpha_e$=0.0245$E_{tot}$−0.235 bounded by 0.5≤$\alpha_e$≤0.99.

For narrowband signals: $\alpha_e$=0.00091$E_{tot}$+0.3185 bounded by 0.5≤$\alpha_e$≤0.999.

The frame non-stationarity is given by the product of the ratios between the frame energy and average long term energy per critical band. That is $$\text{nonstat} = \prod_{i=b_{min}}^{b_{max}} \frac{\max(\overline{E}_{CB}(i), E_{CB,LT}(i))}{\min(\overline{E}_{CB}(i), E_{CB,LT}(i))} \quad (34)$$

The voicing factor for noise update is given by $$\text{voicing}=(C_{norm}(d_0)+C_{norm}(d_1))/2+r_e. \quad (35)$$

Finally, the ratio between the LP residual energy after $2^{nd}$ order and $16^{th}$ order analysis is given by $$\text{resid\_ratio}=E(2)/E(16) \quad (36)$$

where E(2) and E(16) are the LP residual energies after $2^{nd}$ order and $16^{th}$ order analysis, and computed in the Levinson-Durbin recursion of well known to people skilled in the art. This ratio reflects the fact that to represent a signal spectral envelope, a higher order of LP is generally needed for speech signal than for noise. In other words, the difference between E(2) and E(16) is supposed to be lower for noise than for active speech.

The update decision is determined based on a variable noise_update which is initially set to 6 and it is decreased by 1 if an inactive frame is detected and incremented by 2 if an active frame is detected. Further, noise_update is bounded by 0 and 6. The noise energies are updated only when noise_update=0.

The value of the variable noise_update is updated in each frame as follows:

If (nonstat>$th_{stat}$) OR (pc<12) OR (voicing>0.85) OR (resid_ratio>$th_{resid}$)

noise_update=noise_update+2

Else noise_update=noise_update−1 where for wideband signals, $th_{stat}$=350000 and $th_{resid}$=1.9, and for narrowband signals, $th_{stat}$=500000 and $th_{resid}$=11.

In other words, frames are declared inactive for noise update when (nonstat≤$th_{stat}$) AND (pc≥12) AND (voicing≤0.85) AND (resid_ratio≤$th_{resid}$) and a hangover of 6 frames is used before noise update takes place.

Thus, if noise_update=0 then for i=0 to 19 $N_{CB}(i)=N_{tmp}(i)$ where $N_{tmp}(i)$ is the temporary updated noise energy already computed in Equation (17).

Update of Voicing Cutoff Frequency:

The cut-off frequency below which a signal is considered voiced is updated. This frequency is used to determine the number of critical bands for which noise suppression is performed using per bin processing.

First, a voicing measure is computed as $$v_g=0.4C_{norm}(d_1)+0.6C_{norm}(d_2)+r_e \quad (37)$$

and the voicing cut-off frequency is given by $$f_c=0.00017118e^{17.9772v_g} \text{ bounded by } 325\le f_c\le 3700 \quad (38)$$

Then, the number of critical bands, $K_{voic}$, having an upper frequency not exceeding $f_c$ is determined. The bounds of 325≤$f_c$≤3700 are set such that per bin processing is performed on a minimum of 3 bands and a maximum of 17 bands (refer to the critical bands upper limits defined above). Note that in the voicing measure calculation, more weight is given to the normalized correlation of the lookahead since the determined number of voiced bands will be used in the next frame.

Thus, in the following frame, for the first $K_{voic}$ critical bands, the noise suppression will use per bin processing as described in above.

Note that for frames with low voicing and for large pitch delays, only per critical band processing is used and thus $K_{voic}$ is set to 0. The following condition is used:

If $(0.4C_{norm}(d_1)+0.6C_{norm}(d_2)\le 0.72)$ OR $(d_1>116)$ OR $(d_2>116)$ then $K_{voic}=0$.

Of course, many other modifications and variations are possible. In view of the above detailed illustrative description of embodiments of this invention and associated drawings, such other modifications and variations will now become apparent to those of ordinary skill in the art. It should also be apparent that such other variations may be effected without departing from the spirit and scope of the present invention.

What is claimed is:

1. A method comprising:

performing frequency analysis to produce a spectral domain representation of a speech signal comprising a number of frequency bins corresponding to an analysis window;

grouping the frequency bins into a number of frequency bands, where a frequency band comprises at least two frequency bins;

determining whether speech activity in a speech frame of the speech signal is voiced speech activity; and in response to determining that the speech activity is voiced speech activity, performing noise suppression, by a processor, by determining a scaling factor specific for each frequency bin on a per-frequency-bin basis on bins in a first number of frequency bands of the speech frame, wherein the scaling factor specific for each frequency bin is based at least in part on a signal-to-noise ratio determined for the specific frequency bin, and performing noise suppression by determining a scaling factor specific for each frequency band on a per-frequency-band basis on bands in a second number of frequency bands of the speech frame, wherein the scaling factor specific for each frequency band is based at least in part on a signal-to-noise ratio determined for the specific frequency band where determining the scaling factor specific for each frequency bin on a per-frequency-bin basis on the bins in the first number of frequency bands of the speech frame comprises separately calculating the scaling factor specific for each frequency bin on a per-frequency-bin basis on the bins in the first number of frequency bands of the speech frame and where determining the scaling factor specific for each frequency band on a per-frequency-band basis on the bands in the second number of frequency bands of the speech frame comprises separately calculating the scaling factor specific for each frequency band on a per-frequency-band basis on the bands in the second number of frequency bands of the speech frame.

2. A method according to claim 1, wherein the first number of frequency bands is determined according to the number of frequency bands that are voiced.

3. A method according to claim 1, wherein the first number of frequency bands is determined with respect to a voicing cut-off frequency, which is a frequency below which the speech frame is considered voiced.

4. A method according to claim 3, wherein the first number of frequency bands includes all frequency bands of the speech frame that have an upper frequency not exceeding the voicing cut-off frequency.

5. A method according to claim 1, wherein the first number of frequency bands is a predetermined fixed number.

6. A method according to claim 1, wherein if no frequency bands of the speech signal are voiced, noise suppression is performed on a per-frequency-band basis for all frequency bands.

7. A method according to claim 1, wherein speech frames comprise a number of samples.

8. A method according to claim 7, where performing the frequency analysis uses the analysis window that is offset by m samples with respect to a first sample of the speech frame.

9. A method according to claim 7, where the analysis window is a first frequency analysis window, and performing frequency analysis comprises performing a first frequency analysis using the first frequency analysis window that is offset by m samples with respect to a first sample of the speech frame and a second frequency analysis window that is offset by p samples with respect to the first sample of the speech frame.

10. A method according to claim 9, wherein m=24 and p=128.

11. A method according to claim 9, wherein the second frequency analysis window comprises a look-ahead portion that extends from the speech frame into a subsequent speech frame of the speech signal.

12. A method according to claim 1, comprising performing noise suppression by applying a scaling gain to the frequency bins for the first number of the frequency bands and by applying the scaling gain to the frequency bands for the second number of the frequency bands.

13. A method according to claim 6, comprising performing noise suppression by applying a constant scaling gain for all frequency bands.

14. A method according to claim 1, where determining the value for the frequency-bin-specific scaling gain is performed for each of a first and second frequency analysis window.

15. A method according to claim 1, where determining the value for the frequency-band-specific scaling gain is performed for each of a first and second frequency analysis window.

16. A method according to claim 12, wherein the scaling gain is a smoothed scaling gain.

17. A method according to claim 12, comprising calculating a smoothed scaling gain to be applied to a particular frequency bin or a particular frequency band using a smoothing factor having a value that is inversely related to the scaling gain for the particular frequency bin or particular band.

18. A method according to claim 12, comprising calculating a smoothed scaling gain to be applied to a particular frequency bin or a particular frequency band using a smoothing factor having a value determined so that smoothing is stronger for smaller values of scaling gain.

19. A method according to claim 1, where determining the value of the scaling gain occurs n times per speech frame, where n is greater than one.

20. A method according to claim 19, where n=2.

21. A method according to claim 1, comprising determining the value of the scaling gain n times per speech frame, where n is greater than one, and where a voicing cut-off frequency is at least partially a function of the speech signal in a previous speech frame.

22. A method according to claim 1, wherein noise suppression on the per-frequency-bin basis is performed on a maximum of 74 bins corresponding to 17 bands.

23. A method according to claim 1, wherein noise suppression on the per-frequency-bin basis is performed on a maximum number of frequency bins corresponding to a frequency of 3700 Hz.

24. A method according to claim 1, wherein for a first signal-to-noise ratio value, the value of the scaling gain is set to a minimum value, and for a second signal-to-noise ratio value greater than the first signal-to-noise ratio value the value of the scaling gain is set to unity.

25. A method according to claim 24, wherein the first signal-to-noise ratio value is at 1 dB or lower, and where the second signal-to-noise ratio value is at 45 dB or higher.

26. A method according to claim 16, further comprising detecting sections of the speech signal that do not contain active speech.

27. A method according to claim 26, further comprising resetting the smoothed scaling gain to a minimum value in response to detecting a section of the speech signal that does not contain active speech.

28. A method according to claim 7, wherein noise suppression is not performed when a maximum noise energy in a plurality of frequency bands is below a threshold value.

29. A method according to claim 7, further comprising, in response to an occurrence of a short-hangover speech frame, performing noise suppression by applying a scaling gain determined on a per-frequency-band basis for a first x frequency bands and, for the remaining frequency bands, performing noise suppression by applying a single value of scaling gain.

30. A method according to claim 29, wherein the first x frequency bands correspond to a frequency up to 1700 Hz.

31. A method according to claim 16, wherein for a narrowband speech signal the method further comprises performing noise suppression by applying smoothed scaling gains determined on a per-frequency-band basis for a first x frequency bands corresponding to a frequency up to 3700 Hz, performing noise suppression by applying the value of the scaling gain at the frequency bin corresponding to 3700 Hz to frequency bins between 3700 Hz and 4000 Hz, and zeroing the remaining frequency bands of the frequency spectrum of the speech signal.

32. A method according to claim 31, wherein the narrowband speech signal is one that is upsampled to 12800 Hz.

33. A method according to claim 3, further comprising determining the voicing cut-off frequency using a computed voicing measure.

34. A method according to claim 33, further comprising determining a number of critical bands having an upper frequency that does not exceed the voicing cut-off frequency, where bounds are set such that noise suppression on the per-frequency-bin basis is performed on a minimum of x bands and a maximum of y bands.

35. A method according to claim 34, where x=3 and where y=17.

36. A method according to claim 33, where the voicing cut-off frequency is bounded so as to be equal to or greater than 325 Hz and equal to or less than 3700 Hz.

37. An apparatus comprising a processor; and a computer readable memory including computer program code, the computer readable memory and the computer program code configured to, with the processor, cause the apparatus to perform at least the following:

perform frequency analysis to produce a spectral domain representation of a speech signal comprising a number of frequency bins corresponding to an analysis window;

group the frequency bins into a number of frequency bands, where a frequency band comprises at least two frequency bins;

determine whether speech activity in a speech frame of the speech signal is voiced speech activity; and in response to determining that the speech activity is voiced speech activity, perform noise suppression by determining a scaling factor specific for each frequency bin on a per-frequency-bin basis on bins in a first number of frequency bands of the speech frame, wherein the scaling factor specific for each frequency bin is based at least in part on a signal-to-noise ratio determined for the specific frequency bin, and perform noise suppression by determining a scaling factor specific for each frequency band on a per-frequency-band basis on bands in a second number of frequency bands of the speech frame, wherein the scaling factor specific for each frequency band is based at least in part on a signal-to-noise ratio determined for the specific frequency band where determining the scaling factor specific for each frequency bin on a per-frequency-bin basis on the bins in the first number of frequency bands of the speech frame comprises separately calculating the scaling factor specific for each frequency bin on a per-frequency-bin basis on the bins in the first number of frequency bands of the speech frame and where determining the scaling factor specific for each frequency band on a per-frequency-band basis on the bands in the second number of frequency bands of the speech frame comprises separately calculating the scaling factor specific for each frequency band on a per-frequency-band basis on the bands in the second number of frequency bands of the speech frame.

38. An apparatus according to claim 37, wherein the first number of frequency bands is determined according to the number of frequency bands that are voiced.

39. An apparatus according to claim 37, wherein the apparatus is configured to determine the first number of frequency bands with respect to a voicing cut-off frequency, which is a frequency below which the speech frame is considered voiced.

40. An apparatus according to claim 39, wherein the first number of frequency bands includes all frequency bands of the speech signal that have an upper frequency not exceeding the voicing cut-off frequency.

41. An apparatus according to claim 37, wherein the first number of frequency bands is a predetermined fixed number.

42. An apparatus according to claim 37, wherein the apparatus is configured to perform noise suppression on a per-frequency-band basis for all frequency bands when no frequency bands of the speech frame are voiced.

43. An apparatus according to claim 37, wherein speech frames comprise a number of samples.

44. An apparatus according to claim 43, wherein the apparatus is configured to perform the frequency analysis using the analysis window which is offset by m samples with respect to a first sample of the speech frame.

45. An apparatus according to claim 43, where the analysis window is a first frequency analysis window, and wherein the apparatus is configured to perform frequency analysis using the first frequency analysis window that is offset by m samples with respect to a first sample of the speech frame and a second frequency analysis window that is offset by p samples with respect to the first sample of the speech frame.

46. An apparatus according to claim 45, wherein m=24 and p=128.

47. An apparatus according to claim 45, wherein the second frequency analysis window comprises a look-ahead portion that extends from the speech frame into a subsequent speech frame of the speech signal.

48. An apparatus according to claim 37, wherein the apparatus is configured to perform noise suppression by applying a scaling gain to the frequency bins for the first number of the frequency bands and by applying the scaling gain to the frequency bands for the second number of the frequency bands.

49. An apparatus according to claim 42, wherein the apparatus is configured to perform noise suppression by applying a constant scaling gain for all frequency bands.

50. An apparatus according to claim 37, wherein the apparatus is configured to perform the determination of the value for the frequency-bin-specific scaling gain for each of a first and second frequency analysis window.

51. An apparatus according to claim 37, wherein the apparatus is configured to perform the determination of the value for the frequency-bin-specific scaling gain for each of a first and second frequency analysis window.

52. An apparatus according to claim 48, wherein the scaling gain is a smoothed scaling gain.

53. An apparatus according to claim 48, wherein the apparatus is configured to calculate a smoothed scaling gain to be applied to a particular frequency bin or a particular frequency band using a smoothing factor having a value that is inversely related to the scaling gain for the particular frequency bin or particular band.

54. An apparatus according to claim 48, wherein the apparatus is configured to calculate a smoothed scaling gain to be applied to a particular frequency bin or a particular frequency band using a smoothing factor having a value determined so that smoothing is stronger for smaller values of scaling gain.

55. An apparatus according to claim 37, wherein the apparatus is configured to determine the value of the scaling gain n times per speech frame, where n is greater than one.

56. An apparatus according to claim 55, where n=2.

57. An apparatus according to claim 37, wherein the apparatus is configured to determine the value of the scaling gain n times per speech frame, where n is greater than one, and where a voicing cut-off frequency is at least partially a function of the speech signal in a previous speech frame.

58. An apparatus according to claim 37, wherein the apparatus is configured to perform noise suppression on the per-frequency-bin basis on a maximum of 74 bins corresponding to 17 bands.

59. An apparatus according to claim 37, wherein the apparatus is configured to perform noise suppression on the per-frequency-bin basis on a maximum number of frequency bins corresponding to a frequency of 3700 Hz.

60. An apparatus according to claim 37, wherein the apparatus is configured to set, the value of the scaling gain to a minimum value for a first signal-to-noise ratio value, and to set the value of the scaling gain to unity for a second signal-to-noise ratio value greater than the first signal-to-noise ratio value.

61. An apparatus according to claim 60, wherein the first signal-to-noise ratio value is at 1 dB or lower, and where the second signal-to-noise ratio value is at 45 dB or higher.

62. An apparatus according to claim 52 wherein the apparatus is configured to detect sections of the speech frame that do not contain active speech.

63. An apparatus according to claim 62, wherein the apparatus is configured to reset the smoothed scaling gain to a minimum value in response to detecting a section of the speech frame that does not contain active speech.

64. An apparatus according to claim 43, wherein the apparatus is configured not to perform noise suppression when a maximum noise energy, in a plurality of frequency bands is below a threshold value.

65. An apparatus according to claim 43, wherein in response to an occurrence of a short-hangover speech frame, the apparatus is configured to, perform noise suppression by applying a scaling gain determined on a per-frequency-band basis for a first x frequency bands and to perform noise suppression by applying a single value of scaling gain for the remaining frequency bands.

66. An apparatus according to claim 65, wherein the first x frequency bands correspond to a frequency up to 1700 Hz.

67. An apparatus according to claim 52, wherein for a narrowband speech signal the apparatus is configured to perform noise suppression by applying smoothed scaling gains determined on a per-frequency-band basis for a first x frequency bands corresponding to a frequency up to 3700 Hz, to perform noise suppression by applying the value of the scaling gain at the frequency bin corresponding to 3700 Hz to frequency bins between 3700 Hz and 4000 Hz, and to zero the remaining frequency bands of the frequency spectrum of the speech signal.

68. An apparatus according to claim 67, wherein the narrowband speech signal is one that is upsampled to 12800 Hz.

69. An apparatus according to claim 39, wherein the apparatus is configured to determine the voicing cut-off frequency using a computed voicing measure.

70. An apparatus according to claim 69, wherein the apparatus is configured to determine a number of critical bands having an upper frequency that does not exceed the voicing cut-off frequency, where bounds are set such that noise suppression on the per-frequency-bin basis is performed on a minimum of x bands and a maximum of y bands.

71. An apparatus according to claim 70, where x=3 and where y=17.

72. An apparatus according to claim 69, wherein the voicing cut-off frequency is bounded so as to be equal to or greater than 325 Hz and equal to or less than 3700 Hz.

73. A speech encoder comprising a processor; and a computer readable memory including computer program code, the computer readable memory and the computer program code configured to, with the processor, cause the speech encoder to perform at least the following:

perform frequency analysis to produce a spectral domain representation of the speech signal comprising a number of frequency bins corresponding to an analysis window;

group the frequency bins into a number of frequency bands, where a frequency band comprises at least two frequency bins;

determine whether speech activity in a speech frame of the speech signal is voiced speech activity; and in response to determining that the speech activity is voiced speech activity, perform noise suppression by determining a scaling factor specific for each frequency bin on a per-frequency-bin basis on bins in a first number of frequency bands of the speech frame, wherein the scaling factor specific for each frequency bin is based at least in part on a signal-to-noise ratio determined for the specific frequency bin, and perform noise suppression by determining a scaling factor specific for each frequency band on a per-frequency-band basis on bands in a second number of frequency bands of the speech frame, wherein the scaling factor specific for each frequency band is based at least in part on a signal-to-noise ratio determined for the specific frequency band where determining the scaling factor specific for each frequency bin on a per-frequency-bin basis on the bins in the first number of frequency bands of the speech frame comprises separately calculating the scaling factor specific for each frequency bin on a per-frequency-bin basis on the bins in the first number of frequency bands of the speech frame and where determining the scaling factor specific for each frequency band on a per-frequency-band basis on the bands in the second number of frequency bands of the speech frame comprises separately calculating the scaling factor specific for each frequency band on a per-frequency-band basis on the bands in the second number of frequency bands of the speech frame.

74. An automatic speech recognition system comprising apparatus comprising a processor; and a computer readable memory including computer program code, the computer readable memory and the computer program code configured to, with the processor, cause the apparatus to perform in the automatic speech recognition system at least the following:

perform frequency analysis to produce a spectral domain representation of the speech signal comprising a number of frequency bins corresponding to an analysis window;

group the frequency bins into a number of frequency bands, where a frequency band comprises at least two frequency bins;

determine whether speech activity in a speech frame of the speech signal is voiced speech activity; and in response to determining that the speech activity is voiced speech activity, perform noise suppression by determining a scaling factor specific for each frequency bin on a per-frequency-bin basis on bins in a first number of frequency bands of the speech frame, wherein the scaling factor specific for each frequency bin is based at least in part on a signal-to-noise ratio determined for the specific frequency bin, and perform noise suppression by determining a scaling factor specific for each frequency band on a per-frequency-band basis on bands in a second number of frequency bands of the speech frame, wherein the scaling factor specific for each frequency band is based at least in part on a signal-to-noise ratio determined for the specific frequency band where determining the scaling factor specific for each frequency bin on a per-frequency-bin basis on the bins in the first number of frequency bands of the speech frame comprises separately calculating the scaling factor specific for each frequency bin on a per-frequency-bin basis on the bins in the first number of frequency bands of the speech frame and where determining the scaling factor specific for each frequency band on a per-frequency-band basis on the bands in the second number of frequency bands of the speech frame comprises separately calculating the scaling factor specific for each frequency band on a per-frequency-band basis on the bands in the second number of frequency bands of the speech frame.

75. A mobile phone comprising a processor; and a computer readable memory including computer program code, the computer readable memory and the computer program code configured to, with the processor, cause the mobile phone to perform at least the following:

perform frequency analysis to produce a spectral domain representation of the speech signal comprising a number of frequency bins corresponding to an analysis window;

group the frequency bins into a number of frequency bands, where a frequency band comprises at least two frequency bins;

determine whether speech activity in a speech frame of the speech signal is voiced speech activity; and in response to determining that the speech activity is voiced speech activity, perform noise suppression by determining a scaling factor specific for each frequency bin on a per-frequency-bin basis on bins in a first number of frequency bands of the speech frame, wherein the scaling factor specific for each frequency bin is based at least in part on a signal-to-noise ratio determined for the specific frequency bin, and perform noise suppression by determining a scaling factor specific for each frequency band on a per-frequency-band basis on bands in a second number of frequency bands of the speech frame, wherein the scaling factor specific for each frequency band is based at least in part on a signal-to-noise ratio determined for the specific frequency band where determining the scaling factor specific for each frequency bin on a per-frequency-bin basis on the bins in the first number of frequency bands of the speech frame comprises separately calculating the scaling factor specific for each frequency bin on a per-frequency-bin basis on the bins in the first number of frequency bands of the speech frame and where determining the scaling factor specific for each frequency band on a per-frequency-band basis on the bands in the second number of frequency bands of the speech frame comprises separately calculating the scaling factor specific for each frequency band on a per-frequency-band basis on the bands in the second number of frequency bands of the speech frame.

* * * * *